(12) United States Patent
Dobriski et al.

(10) Patent No.: US 9,346,427 B2
(45) Date of Patent: May 24, 2016

(54) ACTIVE COUNTERMEASURES SYSTEMS AND METHODS

(71) Applicant: TENCATE ADVANCED ARMOR USA, INC., Newark, OH (US)

(72) Inventors: Josef Stefan Dobriski, Morgan Hill, CA (US); Andrew Roger Hansen, Goleta, CA (US); Benjamin Riisgaard, Copenhagen (DK); Erick James Sagebiel, Castroville, TX (US); Joergen Leif Svane, Aabenraa (DK); Marc David Taylor, Goleta, CA (US); Victor Wayne Welker, Los Olivos, CA (US)

(73) Assignee: Tencate Advanced Armor USA, Inc., Newark, OH (US)

(*) Notice: Subject to any disclaimer, the term of this patent is extended or adjusted under 35 U.S.C. 154(b) by 266 days.

(21) Appl. No.: 13/909,295

(22) Filed: Jun. 4, 2013

(65) Prior Publication Data

US 2015/0251616 A1 Sep. 10, 2015

Related U.S. Application Data

(60) Provisional application No. 61/689,468, filed on Jun. 6, 2012, provisional application No. 61/689,471, filed on Jun. 6, 2012.

(51) Int. Cl.
*B60R 22/00* (2006.01)
*B60R 21/01* (2006.01)
(Continued)

(52) U.S. Cl.
CPC ............... *B60R 21/01* (2013.01); *B60R 16/02* (2013.01); *F41H 7/042* (2013.01); *F42B 5/02* (2013.01); *F42B 12/02* (2013.01); *F42C 19/08* (2013.01); *F42D 5/04* (2013.01); *F42D 5/045* (2013.01)

(58) Field of Classification Search
CPC ................... F41H 11/00; F41H 5/007; B60R 2021/01345; B60R 2021/135; B60R 2021/138; B60R 21/12
See application file for complete search history.

(56) References Cited

U.S. PATENT DOCUMENTS

| 3,580,354 A | 5/1971 | Hewitt |
| 3,995,656 A | 12/1976 | Mills, Jr. |

(Continued)

FOREIGN PATENT DOCUMENTS

| DE | 2031658 | 7/1979 |
| DE | 3118377 | 6/1982 |

(Continued)

OTHER PUBLICATIONS

International Preliminary Report on Patentability dated Dec. 18, 2014 in Application No. PCT/US2013/044024.

(Continued)

*Primary Examiner* — Michael D Lang
(74) *Attorney, Agent, or Firm* — Kilpatrick Townsend & Stockton LLP; Dean W. Russell

(57) ABSTRACT

Described are systems and methods for actively countering certain forces experienced by, for example, a person within a vehicle. Adverse effects of blast waves of a mine or other explosive device (including improvised explosive devices [IEDs]) may be mitigated by the countermeasures systems, which may include any or all of a first responder unit (FRU), a control display assembly (CDA), processors, sensors, and an electronic safe and arm device (ESAD). Each component assembly may be incorporated into a line replaceable unit (LRU) if desired, although such incorporation is not necessary.

17 Claims, 6 Drawing Sheets

(51) Int. Cl.
    *F41H 7/04*    (2006.01)
    *B60R 16/02*   (2006.01)
    *F42D 5/04*    (2006.01)
    *F42D 5/045*   (2006.01)
    *F42B 5/02*    (2006.01)
    *F42B 12/02*   (2006.01)
    *F42C 19/08*   (2006.01)

(56) References Cited

U.S. PATENT DOCUMENTS

| | | | |
|---|---|---|---|
| 4,573,396 | A | 3/1986 | Streetman et al. |
| 5,012,721 | A | 5/1991 | Medin et al. |
| 5,401,055 | A | 3/1995 | Pham |
| 5,765,783 | A | 6/1998 | Albion |
| 5,931,499 | A | 8/1999 | Sutherland |
| 6,065,558 | A | 5/2000 | Wielenga |
| 6,095,459 | A | 8/2000 | Codina |
| 6,170,847 | B1 | 1/2001 | Pham |
| 6,394,738 | B1 | 5/2002 | Springer |
| 6,556,908 | B1 | 4/2003 | Lu et al. |
| 6,588,799 | B1 | 7/2003 | Sanchez |
| 6,938,924 | B2 | 9/2005 | Feldman et al. |
| 7,494,153 | B2 | 2/2009 | Wang |
| 2004/0200347 | A1 | 10/2004 | Grosch |
| 2005/0230176 | A1 | 10/2005 | Wang |
| 2006/0027419 | A1 | 2/2006 | Ponomarev et al. |
| 2006/0086243 | A1 | 4/2006 | Seo et al. |
| 2007/0144337 | A1 | 6/2007 | Zhang et al. |
| 2008/0216699 | A1* | 9/2008 | McAleer et al. ............ 102/367 |
| 2011/0245994 | A1 | 10/2011 | Sloman |
| 2012/0239247 | A1 | 9/2012 | Eridon |
| 2013/0204496 | A1* | 8/2013 | Sloman ........................ 701/45 |

FOREIGN PATENT DOCUMENTS

| | | |
|---|---|---|
| DE | 2822106 | 8/1996 |
| DE | 19631715 | 1/2000 |
| DE | 19832662 | 2/2000 |
| DE | 19913845 | 6/2002 |
| DE | 10259918 | 7/2004 |
| DE | 10317314 | 7/2004 |
| DE | 10259918 | 6/2005 |
| DE | 202005006655 | 8/2005 |
| DE | 19909905 | 7/2009 |
| EP | 1382932 | 1/2004 |
| EP | 1467171 | 10/2004 |
| EP | 1605225 | 12/2005 |
| EP | 1698850 | 9/2006 |
| EP | 1746379 | 1/2007 |
| EP | 1790938 | 5/2007 |
| EP | 2003418 | 12/2008 |
| EP | 2362177 | 8/2011 |
| FR | 2907206 | 4/2008 |
| RU | 2003127462 | 3/2005 |
| WO | 0239048 | 5/2002 |
| WO | 2004106840 | 12/2004 |
| WO | 2005113330 | 12/2005 |
| WO | 2006034528 | 4/2006 |
| WO | 2008063205 | 5/2008 |
| WO | 2009114172 | 9/2009 |
| WO | 2009117648 | 9/2009 |
| WO | 2010067093 | 6/2010 |
| WO | 2011148118 | 12/2011 |
| WO | 2011148118 A1 | 12/2011 |
| WO | 2012035282 | 3/2012 |
| WO | 2012052768 | 4/2012 |
| WO | 2012085138 | 6/2012 |
| WO | 2014039126 A2 | 3/2014 |

OTHER PUBLICATIONS

PCT/US2013/044024, International Search Report and Written Opinion dated Apr. 2, 2014, 10 pages.

DARPA: "Persistent Stare Exploitation and Analysis System (PerSEAS)," Federal Business Opportunities, Sep. 18, 2009 (3 pages).

* cited by examiner

CM Design
- Cartridge CM - Removable for logistics (shipping and storage).
  - Top seals CM and indicate CM is loaded and has not been fired
- Ejected Mass
  - Disintegrating material
- Main Charge
  - Propellent MOTS
- Detonation to deflagration transition
- Detonating Cord - Insensitive energetic cord used to distribute firing pulse from one ESAD to multiple CMs.

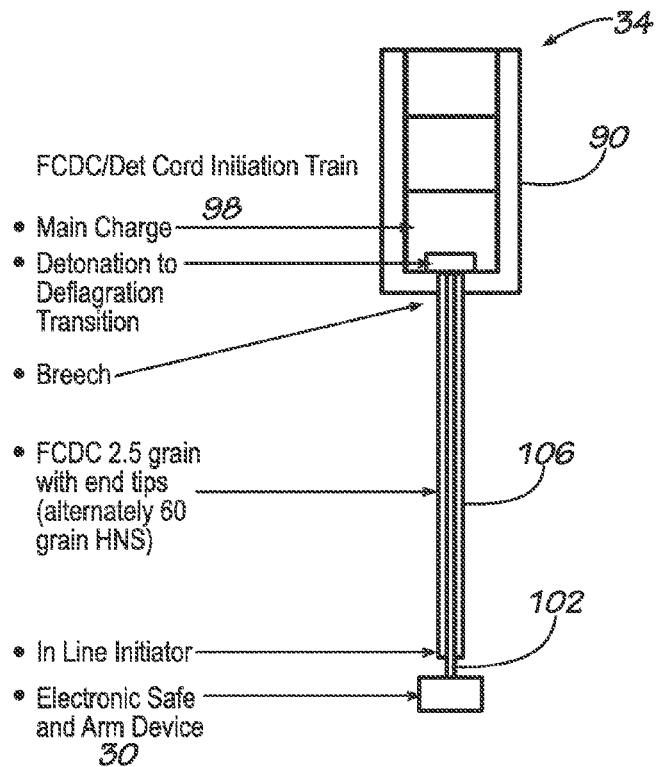

FCDC/Det Cord Initiation Train

- Main Charge — 98
- Detonation to Deflagration Transition
- Breech
- FCDC 2.5 grain with end tips (alternately 60 grain HNS)
- In Line Initiator
- Electronic Safe and Arm Device

FIG. 4

Counter Measures Bank Assembly (CM)

Features of CM Cartridge

- CM Banks Assembled to Vehicle domestically or at field depot in theatre
- CM Cartridges, FCDC connectors and ESADs shipped separately
- CM Cartridges installed in theatre, can be removed for vehicle shipping. Come with Flexible Confined Detonating Cord Connector.
- ESADs and detonating cord can be behind passive armour
- Partial or full CM Tube/Cartridge armour

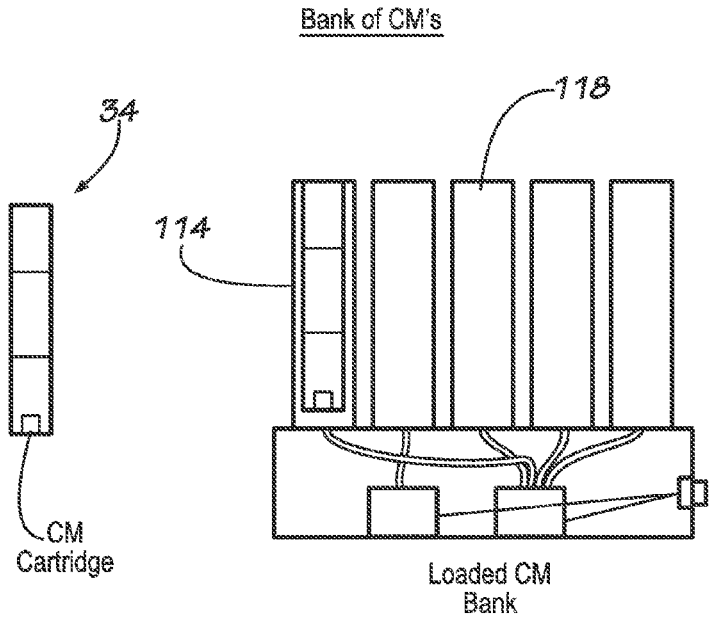

FIG. 5A      FIG. 5B

CM Material and Construction Options
- Bore Holes in Solid Block
- Sculpted block
- Metallic Tubes (unitary or sleeved)
- Composite Tubes (with or without metallic liner/mandrel)
- Composite Breech option

ACTIVE COUNTERMEASURES SYSTEMS AND METHODS

CROSS-REFERENCE TO RELATED APPLICATIONS

This application claims the benefit of (1) U.S. Provisional Patent Application Ser. No. 61/689,468, filed Jun. 6, 2012, and entitled "Physical Design Criteria for Active Blast Countermeasure System" and (2) U.S. Provisional Patent Application Ser. No. 61/689,471, filed Jun. 6, 2012, and entitled "Active Blast Countermeasure System," the entire contents of both of which applications are incorporated herein by this reference.

FIELD OF THE INVENTION

This invention relates to systems and methods for actively countering forces experienced by an object or person and more particularly, although not exclusively, to systems and methods for actively countering forces experienced by a manned (or unmanned) vehicle upon encountering blast waves of a mine or other explosive device or other undesired forces.

BACKGROUND OF THE INVENTION

U.S. Patent Application Publication No. 2012/0239247 of Eridon, whose contents also are incorporated herein by this reference, purports to disclose "systems and methods for mitigating the effects of sudden accelerative forces on vehicles due to, for example, land mines and improvised explosive devices (IEDs)." See Eridon Application, p. 1, ¶0002. Described generally in the Eridon Application is such a system having sensors, a control system, countermeasures, and a human interface. According to the Eridon Application, the control system, which is communicatively coupled to the plurality of sensors and countermeasures, is configured to determine the dynamic response of [a] vehicle based on the set of acceleration signals, then determine whether mitigation is required based on the dynamic response of the vehicle—e.g. whether the dynamic response of the vehicle is likely to cause harm to occupants of the vehicle. If it is determined that mitigation is required, [the] control system produces one or more countermeasure signals selected to at least partially counteract the dynamic response.... Countermeasures then activate in response to the one or more countermeasure signals, thereby at least partially counteracting the dynamic response of [the] vehicle.

See id., pp. 1-2, ¶0017 (numerals omitted).

Absent from the skeletal Eridon Application is, among other things, any discussion of numerous components of a satisfactory countermeasures system. No comprehensive trigger and activation system (TAS) is described, for example, and the sole identifications of a "human interface" in the Eridon Application are a block in the diagram of its FIG. 1 and the statement that it may include "any combination of processors, memory, storage, displays, [and] input devices." See id., p. 3, ¶0029. Further, the only sensor detail provided in the Eridon Application relates to a particular piezoresistive accelerometer sold by a company called Measurement Specialties, and the countermeasures identification is limited to, generically, "an explosive or a propellant" possibly provided by DuPont. See id., ¶¶0027-28.

SUMMARY OF THE INVENTION

The present invention seeks to supply multiple novel components and techniques for creating active countermeasures systems deployable under a wide variety of hostile and other conditions. An exemplary TAS may, for example, comprise any or all of a first responder unit (FRU), a control display assembly (CDA), processors, sensors, and an electronic safe and arm device (ESAD). Each component assembly may be incorporated into a line replaceable unit (LRU) if desired, although such incorporation is not necessary.

Together with appropriate countermeasures, the TAS may be used to protect crew members of a vehicle from injury or death caused by, for example, IED or mine blasts or vehicle collisions or rollovers. Systems of the invention additionally may record event or damage information (for maintenance, evaluation, or otherwise) or transmit it remotely to alert other vehicles or headquarters operations of impending danger. The Global Positioning System (GPS) or any other suitable locator system may be used in connection with the invention.

The FRU is configured to allow personnel outside a vehicle to disable the countermeasures of the vehicle when appropriate to do so. Should personnel within the vehicle be injured or trapped, for example, first responders may need to breach the vehicle hull or otherwise attempt to enter the vehicle for rescue purposes. Because in some cases these actions could risk activation of any undeployed countermeasures, to avoid further risk to life and property first responders desirably may disable the countermeasures before acting. Preferably (although not necessarily) at least one FRU is mounted near the front or rear of the vehicle so as to be accessed externally thereof; a locking cover or other structure may be provided to reduce the possibility of inadvertent or improper disabling of the countermeasures.

The CDA is intended to allow crew of a vehicle to monitor and control status of the countermeasures systems. It preferably provides visual indication of system status, although aural, tactile, or other status indications may be provided alternatively or additionally. Equally preferably, the CDA comprises multiple switches necessarily operated in certain sequences and at certain time intervals to reduce risk of unintended arming or disarming of the countermeasures by the vehicle crew. The switches, further, beneficially may have differing actuating mechanisms, although such differing mechanisms are not required.

One or more processors may be utilized as part of each countermeasures system of the present invention. Preferably the processors are dual-core, allowing for parallel processing to occur. Data buses may transfer signals to and from the processors, which also may communicate electrically with a system interface chip (integrated circuit). Processors may control, provide information to, or receive information from, any or all of the FRU, CDA, and ESAD, vehicle sensors, and vehicle safety equipment such as airbags, active seat controls, intelligent clothing, seatbelt pretensioners, etc.

Sensors associated with the present invention may sense any or all of pressure, angular movement rate, acceleration, strain (deformation), force, displacement, velocity, or electric or magnetic field strength. Because the sensors may be deployed in electrically-noisy environments, signals from the sensors may be encoded using, for example, Manchester coding principles. Preferably, multiple sensors are used on each vehicle, with at least some not co-located with others. If desired, countermeasures deployment may be conditioned on certain signal types and durations being received from multiple non-co-located sensors.

The ESAD functions to arm and initiate countermeasures upon command of a processor. Like various other aspects of the inventive systems, the ESAD preferably "fails safe"—i.e. if it is non-functional, it enters or reverts to a mode in which countermeasures cannot activate. Fuze cord or any other suitable material may connect the ESAD to the countermeasures.

Countermeasures themselves may be of varying types yet remain consistent with the present invention. Advantageously, however, countermeasures may include cartridges into which ejectable masses and charges are loaded. Currently preferred ejectable masses are predominantly solids (as opposed to liquids or gases), with preferred solids either being disintegrable or comprising multiplicities of disintegrated particles. If so, the likelihood of serious injury to a bystander impacted by a portion of the ejected mass may be reduced.

Cartridge countermeasures may be placed in barrels mounted to or otherwise connected or attached to vehicles. The barrels may be constructed in sets or individually as desired and configured to receive cartridges in any manner allowing initiation of the propellant. In some versions of the invention, banks of barrels are mounted at the four corners of the roof of a vehicle. Alternatively or additionally, barrels may be mounted on vehicle sides, fronts, or rears. Presently preferred in some versions is that barrels not be placed on the vehicle undercarriage, although such placement could occur in other versions. Because the cartridges are separate from the barrels, the cartridges may be transported apart from the barrels and loaded only when needed, further reducing risk of undesired countermeasure deployment.

It thus is an optional, non-exclusive object of the present invention to provide systems and methods for countering at least certain undesired forces acting on a vehicle.

It is another optional, non-exclusive object of the present invention to provide systems and methods for devising countermeasures systems deployable under a wide variety of conditions.

It is also an optional, non-exclusive object of the present invention to provide systems and methods incorporating some or all of an FRU, a CDA, processors, sensors, and an ESAD, any of which may be incorporated into an LRU.

Numerous other objects, feature, and advantages of the present invention will be apparent to those skilled in relevant fields with reference to the remaining text and the drawings of this application.

BRIEF DESCRIPTION OF THE DRAWINGS

FIG. 4 is a partially-schematicized view of fuze or detonation cord connecting a countermeasure of the type shown in FIG. 3 to an ESAD consistent with the present invention.

FIGS. 5A-F are various views of possible configurations of countermeasures of the type shown in FIG. 3.

DETAILED DESCRIPTION

Figure 1:
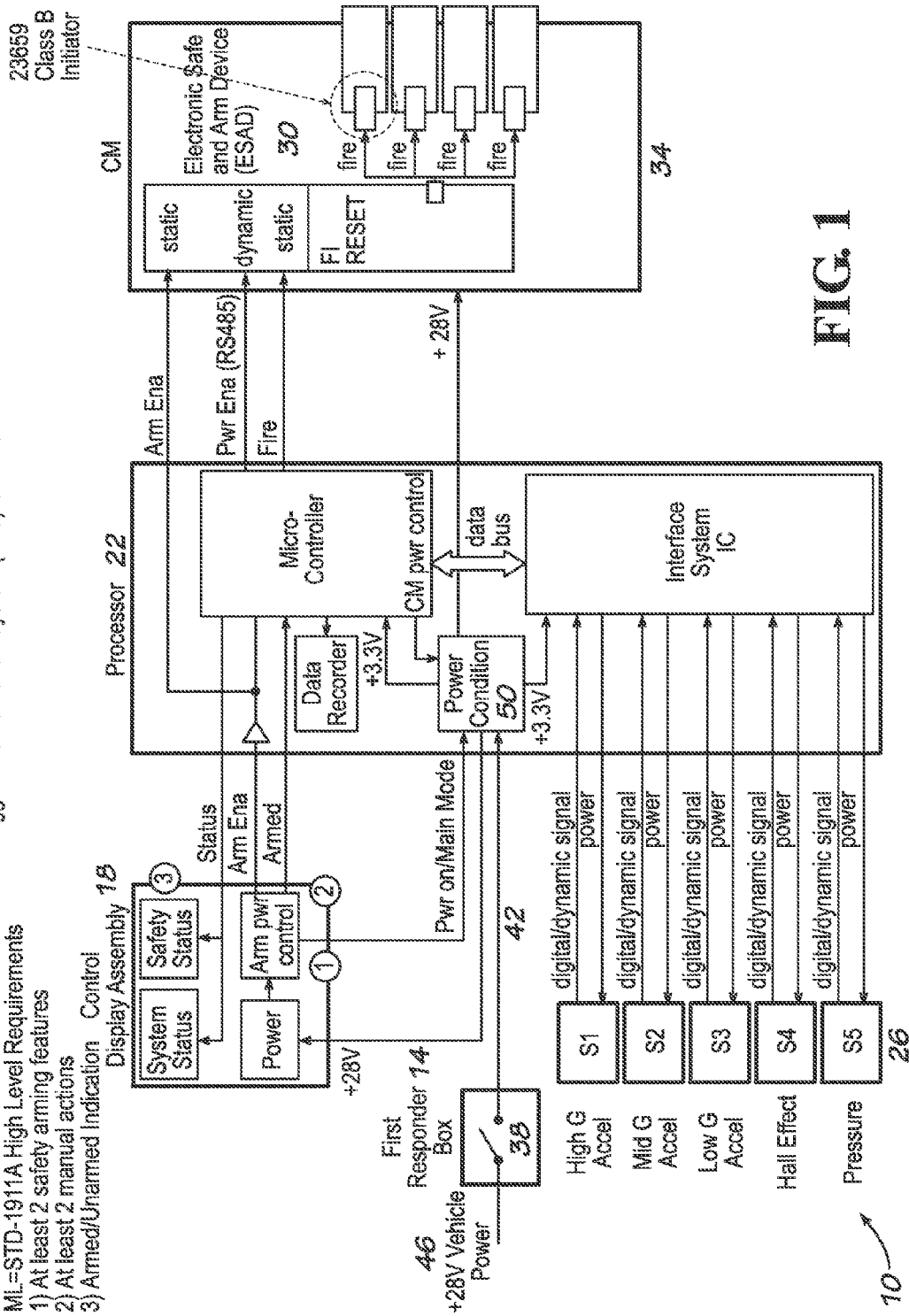
FIG. 1 is a block diagram of aspects of a TAS consistent with the present invention.
Figure 7:
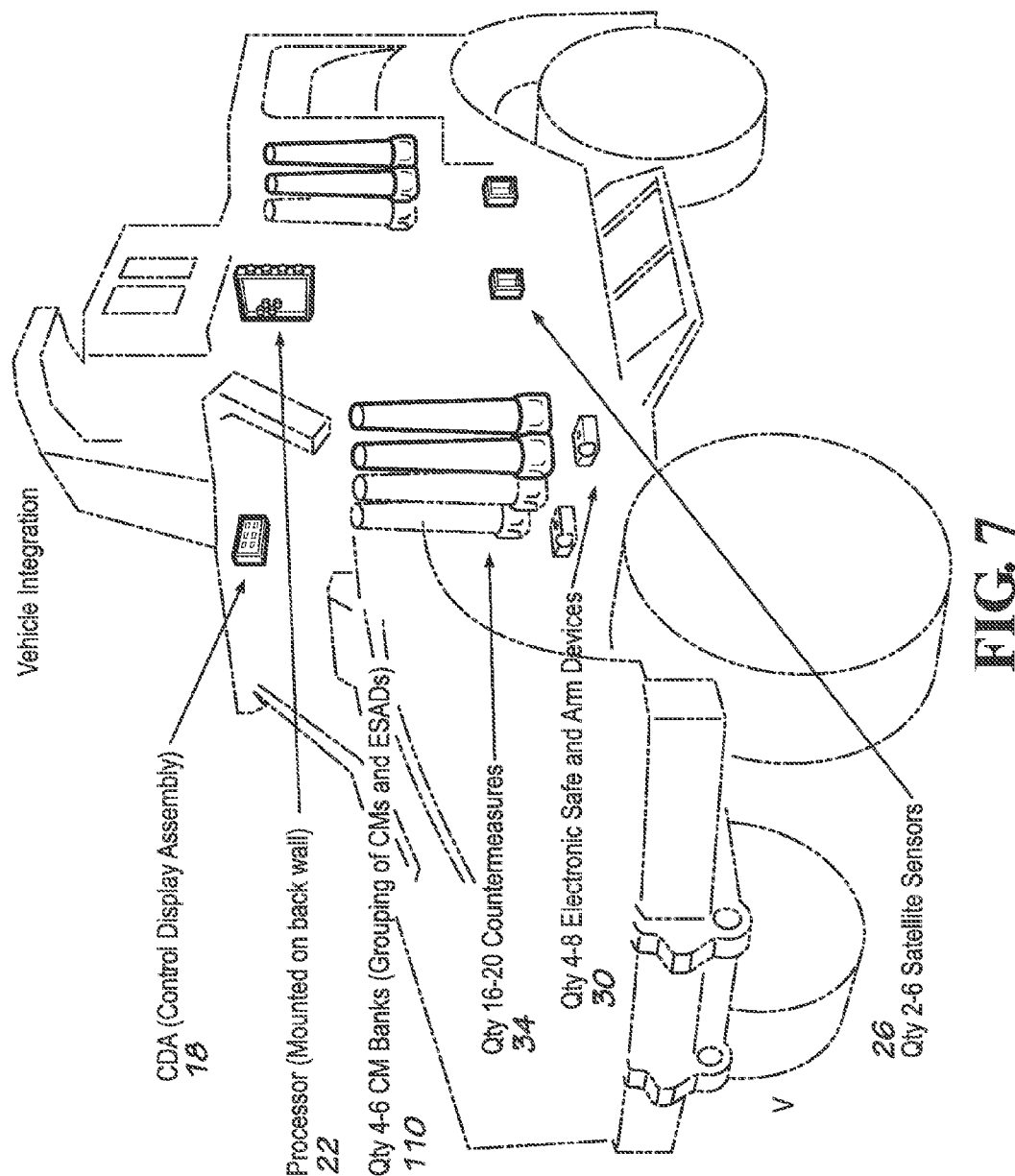
FIG. 7 is a perspective view of a vehicle including countermeasures of the type shown in FIG. 3.

Depicted in FIG. 1 is a block diagram of an exemplary TAS 10 of the present invention. TAS 10 may include FRU 14, CDA 18, processor 22, one or more sensors 26, ESAD 30, and one or more countermeasures 34. Although conceivably useful wherever force-related countermeasures are desirably deployed—as to prevent vehicle rollover, for example, TAS 10 is especially designed for use in connection with a vehicle (labeled "V" in FIG. 7) operating in a theatre in which IEDs, mines, or other explosive devices may be present.

As illustrated in FIG. 1, FRU 14 includes at least switch 38. Switch 38 preferably is interposed in the main power supply line 42 of the vehicle between power supply 46 (e.g. a battery or electrical generator) and ESAD 30 to which countermeasures 34 are connected. If switch 38 is open, electricity is not available for ESAD 30 to arm the countermeasures 34 for deployment.

FRU 14 beneficially may include a box housing switch 38 and be either attached to or integrated into a hull of a vehicle so as to be accessible externally thereof. Alternatively, FRU 14 may comprise a cover for switch 38 or any other object or assembly configured to restrict access to the switch 38. In at least some embodiments of the invention, FRU 14 will be locked, limiting access to switch 38 to those possessing an appropriate unlocking key or tool or knowing a suitable combination of symbols.

In particular, first responders to an accident or catastrophe involving the vehicle may need to breach its hull or otherwise enter its interior so as to rescue personnel or equipment contained therein. Entry activities of these first responders, or other actions impacting the vehicle, could risk activation of as-yet undeployed countermeasures 34. Accordingly, the first responders may desire to access and open switch 38 upon arrival at the vehicle so as to reduce the possibility of countermeasures 34 deployed undesirably. Of course, persons skilled in appropriate fields of endeavor will recognize that FRU 14 is optional and in certain circumstances either may be omitted from TAS 10 or configured otherwise as described herein.

Figure 2:
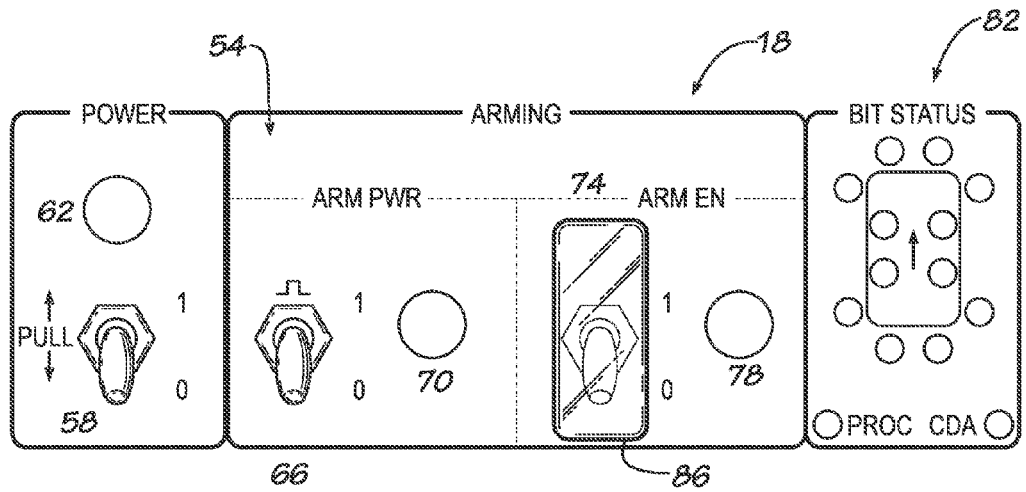
FIG. 2 is a front elevational view of an exemplary CDA consistent with the present invention.

CDA 18 appears in FIGS. 1-2. As noted in FIG. 1, CDA 18 beneficially may—but need not necessarily—include (a) at least two safety arming features, (b) at least two manual actions, and (c) an indicator of whether countermeasures 34 are armed. CDA 18 additionally advantageously may be powered by power supply 46 (albeit perhaps after the power undergoes conditioning by power conditioner 50), although other sources of electricity possibly may be used instead. Outputs of CDA 18 may be connected electrically to (at least) processor 22. Although wired connections among various components of TAS 10 typically are preferred, wireless communication among some or all of the components alternatively may occur.

CDA 18 functions to, among other things, allow crew of a vehicle to control and monitor status of TAS 10. CDA 18 preferably is positioned in a dashboard of a vehicle with its face 54 visible to the crew and may, for example, include power switch 58 and an associated visual indicator 62. Also depicted in FIG. 2 are arm power switch 66 and its associated visual indicator 70, arm enable switch 74 and its associated visual indicator 78, and plural bit status indicators 82. Arm enable switch 74 may be covered by a pivotable or otherwise movable (or removable) cover 86 that must be moved physically in order to access the arm enable switch 74.

In at least some versions of the invention, and assuming switch 38 is closed, TAS 10 may be initialized by closing power switch 58 (shown in FIG. 2 as a two-position toggle switch). In normal operating circumstances, closing power switch 58 illuminates associated indicator 62, indicating to a crewmember that power switch 58 is closed so as to supply power to CDA 18. Closing power switch 58 also causes processor 22 to initiate a power-on self-test (POST), with arm power switch 58 and arm enable switch 74 preferably remaining inactive at least until the POST is complete.

During the POST, bit status indicators 82 preferably flash in an orange hue. Successful completion of the POST causes bit status indicators 82 to remain illuminated for a brief period (e.g. one second) and then darken if all LRUs are deemed to be operating normally. By contrast, if an LRU fails the POST, its corresponding bit status indicator 82 will remain illuminated. Further, if any failure constitutes a safety-critical system fault, TAS 10 will enter a "fail safe" mode, and any attempt to recover from such a mode will, at minimum, require power switch 58 to be toggled off and then back on.

Following successful completion of the POST, respective arm power and arm enable switches 58 and 74 may become active. Arm power switch 58 preferably is a momentary switch; to initiate arming of countermeasures 34, an operator toggles the switch 58 and releases it. Under normal operation and proper sequencing, indicator 70 illuminates in a yellow hue.

One proper sequencing technique requires crew manipulation of arm enable switch 74 to occur within a defined time period following toggling and release of arm power switch 58. Such a defined time period may, for example, be between approximately 0.5-6.0 seconds. If switch 74 is not manipulated within the period, indicator 70 will de-illuminate and arm power switch 58 will deactivate, necessitating re-toggling and release of switch 58 to re-start the sequence. By contrast, if cover 86 is moved and switch 74 is manipulated within the period, indicator 78 illuminates and TAS 10 enters an "arm enable" mode.

With TAS 10 in this "arm enable" mode, processor 22 controls deployment of countermeasures 34 (unless switch 38 or 58 is opened). Processor 22 directly or indirectly receives signals from sensors 26 and determines if deployment of any countermeasure 34 is appropriate. If deployment is appropriate, processor 22 signals ESAD 30. In some versions of the invention, processor 22 may be housed in an enclosure having deformable brackets so as to allow dampening of shocks otherwise likely experienced by the processor 22.

Figure 3:
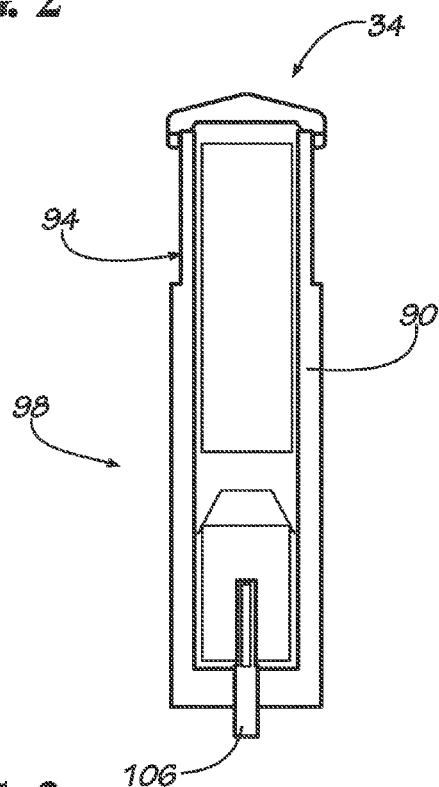
FIG. 3 is a partially-schematicized, cross-sectional view of portions of a countermeasure consistent with the present invention.
Figure 5D:
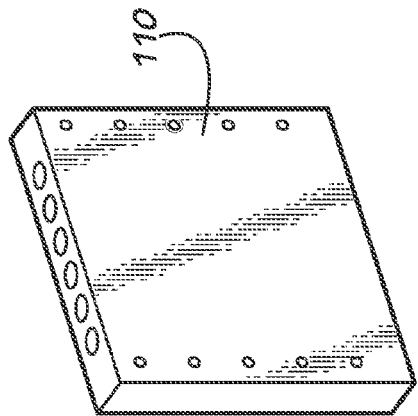
Figure 5E:
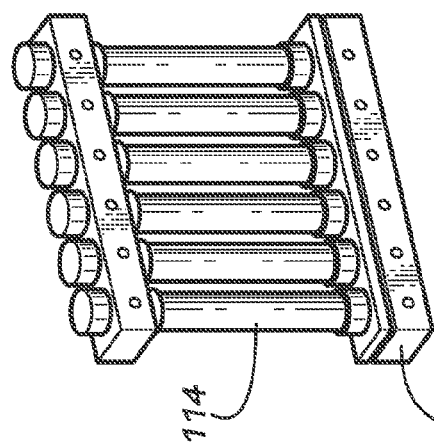
Figure 5C:
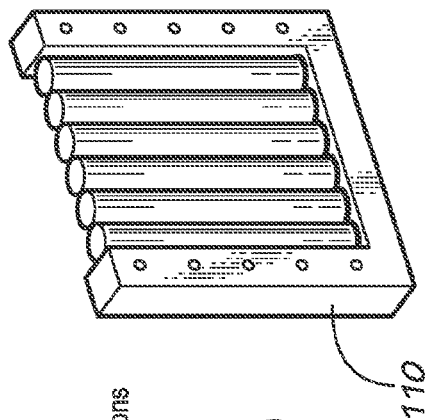
Figure 5F:
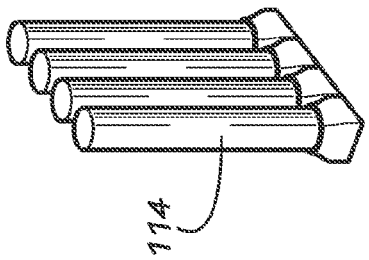

FIGS. 3-4 and 5A illustrate a sample countermeasure 34. Countermeasure 34 may be assembled as a cartridge to facilitate shipping and storage, for example. It may include housing 90 containing at least mass 94 and charge 98. Countermeasure 34 may connect to ESAD 30 and initiator 102 using conventional detonation cord 106.

Presently-preferred masses 94 are predominantly solids (rather than liquids or gases). Such preferred solids either are disintegrable upon ejection from the vehicle or comprise multiplicities of disintegrated particles. Disintegration of mass 94 upon deployment of countermeasures 34 is preferred so as to reduce likelihood of serious injury to at least some bystanders possibly impacted by mass 94.

Charge 98 may be or include any propellant or other substance capable of causing a countermeasure 34 to eject from a vehicle. Upon receipt of a suitable signal from processor 22, ESAD 30 activates initiator 102, which in turn ignites detonation cord 106 connected to a countermeasure 34. Detonation of cord 106 causes deflagration (if pyrotechnic) or other activation of charge 98 so as to eject mass 94 from the vehicle. A single initiator 102 may be employed to launch any number of countermeasures 34; alternatively, each countermeasure 34 may be associated with a separate initiator 102. To expedite initiation, capacitors associated with initiator 102 may be pre-charged under certain conditions.

FIGS. 5B-F depict various examples of banks 110 of barrels 114 into which countermeasure 34 may be loaded. Banks 110 may be mounted to vehicles at any suitable time either before or after the vehicles enter a hostile environment. Although cartridges of countermeasures 34 likewise may be loaded into barrels 114 at any time, preferably they remain unloaded until a vehicle is slated to approach or enter an environment in which deployment of countermeasures 34 may be considered reasonably likely. Barrels 114 may be made of metal, composites, or other suitable material and may be attached to or formed within banks 110.

FIG. 5B schematically illustrates a bank 110 containing five barrels 114, one of which is loaded with a countermeasure 34. Bank 110 may be mounted onto a vehicle (see, e.g., FIG. 7) in any desired location. In some embodiments of the invention, a bank 110 is mounted onto a vehicle at or adjacent each of its four corners (front left, front right, rear left, rear right).

Depending on the locations and types of forces encountered by sensors 26, any one or more banks 110 may launch countermeasures 34. Moreover, if a bank 110 includes more than one barrel 114, less than all countermeasures 34 loaded in the barrels 114 may be launched at any particular time. Launching of countermeasures 34 further may be staggered or sequenced in time (either within a particular bank 110 or between particular banks 110).

Presently preferred is that barrels 114 be vertical (or substantially so) with their openings 118 positioned upward when mounted to a vehicle. In this manner, a countermeasure 34 will be ejected upward from the vehicle upon deployment, producing a downward force vector upon ejection. Such downward force vector is intended to counteract (in whole or in part) an upward force impacting a vehicle because of, e.g., explosion of a mine or IED, collision of the vehicle with an object, or departure of the vehicle from a roadway or other normal travel surface.

Alternatively, one or more barrels 114 could be tilted or otherwise repositionable relative to a (nominal) vertical orientation. If so, deployment of materials loaded therein could be used to establish different force vectors acting on a vehicle, or the barrels 114 (regardless of orientation) could be used to deploy flares, missiles, projectiles, or other objects for various purposes. Because banks 110 themselves may have substantial mass, they may function as armor for a vehicle. Reactive armor plates or tiles may be deployed, as may any mass associated with a vehicle (e.g. engine, engine cover, battery, water supply, passive armor, etc.).

TAS 10 may be modular, scalable, and configured to be adapted for use with a variety of vehicles or other objects. Sensors 26 may sense such things as changes in acceleration, pressure, strain (deformation), force, displacement, infrared (IR) signals, radio frequency (RF) signals, acoustic signals, electric or magnetic field strength, or RADAR or LIDAR signals. Those skilled in the art will recognize that other signals, events, or changes may be sensed alternatively or additionally. However, presently preferred as sensors 26 are accelerometers augmented by either or both of strain and force sensors. At least some sensors 26 preferably are housed in enclosures mounted to or integrated into areas of a vehicle such as its A/B/C/D pillars or drivetrain tunnel or in other stiff (rigid) structural locations.

Figure 6:
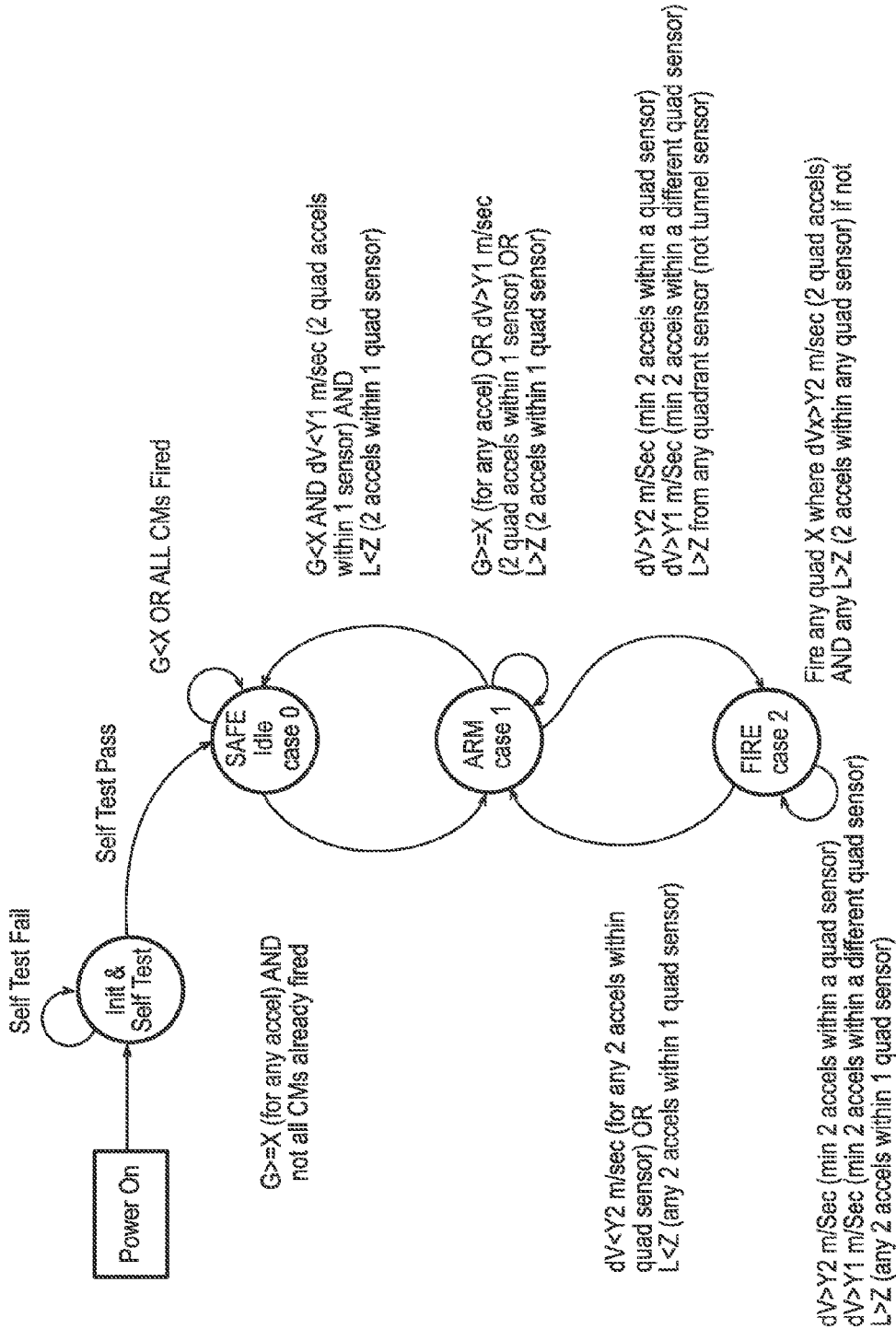
FIG. 6 illustrates an exemplary algorithm for deploying one or more countermeasures of the type shown in FIG. 3.

Data from sensors 26 may be filtered or encoded (or both) to reduce noise or other incorrect information being received by processor 22. Some versions of TAS 10 further contemplate comparing information from at least two non-co-located sensors 26 as part of an assessment of the validity and location of a blast or other event. FIG. 6 identifies an example of certain logical conditions in which firing countermeasures 34 may be deemed appropriate. Computational logic assesses information from sensors 22 relating to "Effective G" (as discussed in S. Arepally, et al., "Application of Mathematical Modeling in Potentially Survivable Blast Threats in Military Vehicles," 26th Army Science Conference, Dec. 1-4, 2008, the contents of which are incorporated herein in their entirety by this reference) and changes in vehicle velocity (dV) as a function of time length (L). In the exemplary case of FIG. 6 (as simplified for ease of explanation):

If G is less than a threshold value X or all countermeasures 34 have already fired, TAS 10 remains in a "safe" or "idle" mode.
  If G is greater than or equal to X and at least one countermeasure 34 remains unfired, TAS 10 is armed; however, if G subsequently becomes less than X, dV is less than a threshold Y1 and L is less than a threshold Z, TAS 10 returns to the safe or idle mode.
  Once armed, TAS 10 remains so if G is greater than or equal to X or if dV is greater than Y1 or L is greater than Z.
  If dV of one sensor set (S1) exceeds Y2 (where Y2>Y1), dV of a different sensor set (S2) exceeds Y1, and L exceeds Z, any unfired countermeasures 34 associated with set S1 fire.
  By contrast, if no dV measurement exceeds Y2 or L is less than Z, then TAS 10 remains armed but does not fire.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A force-countering system for a vehicle, comprising:
   a. a first sensor configured for direct or indirect connection to or integration into the vehicle;
   b. a processor directly or indirectly communicating with the sensor so as to receive data therefrom;
   c. an arming device directly or indirectly communicating with the processor so as to receive data therefrom;
   d. a power control assembly comprising plural switches which, when closed in a pre-determined sequence during a pre-determined time period, provide power directly or indirectly to the arming device; and
   e. a first countermeasure (i) configured for direct or indirect connection to or integration into the vehicle and (ii) comprising a first mass ejectable relative to the vehicle following command of the arming device.

2. A force-countering system for a vehicle, comprising:
   a. a first sensor configured for direct or indirect connection to or integration into the vehicle;
   b. a processor directly or indirectly communicating with the sensor so as to receive data therefrom;
   c. an arming device directly or indirectly communicating with the processor so as to receive data therefrom;
   d. a power control assembly comprising plural switches which, when closed in a pre-determined sequence during a pre-determined time period, provide power directly or indirectly to the arming device;
   e. a first countermeasure (i) configured for direct or indirect connection to or integration into the vehicle and (ii) comprising a first mass ejectable relative to the vehicle following command of the arming device; and
   f. a power switch accessible externally of the vehicle and which, when opened, prevents powering of the arming device.

3. A force-countering system according to claim 1 in which the sensor senses an acceleration of the vehicle.

4. A force-countering system according to claim 1 in which the first countermeasure comprises a cartridge comprising a housing containing the first mass and a charge.

5. A force-countering system according to claim 1 further comprising a bank of barrels configured to receive the first countermeasure.

6. A force-countering system according to claim 1 further comprising an initiator and a detonation cord connecting the arming device and the first countermeasure.

7. A force-countering system according to claim 1 in which the first mass either is disintegrable following ejection or comprises multiple disintegrated particles.

8. A force-countering system according to claim 1 further comprising a second sensor located remote from the first sensor.

9. A force-countering system according to claim 1 further comprising a second countermeasure (a) located remote from the first countermeasure and (b) comprising a second mass ejectable relative to the vehicle following command of the arming device.

10. A force-countering system according to claim 9 in which the second mass may be ejected independently of ejection of the first mass.

11. A force-countering system for a vehicle, comprising:
    a. a first sensor configured for direct or indirect connection to or integration into the vehicle;
    b. a processor directly or indirectly communicating with the sensor so as to receive data therefrom;
    c. an arming device directly or indirectly communicating with the processor so as to receive data therefrom;
    d. a power control assembly comprising plural switches which, when closed in a pre-determined sequence during a pre-determined time period, provide power directly or indirectly to the arming device, in which the plural switches comprise (i) a non-momentary switch, (ii) a momentary switch, and (iii) an arm enable switch covered by a movable cover; and
    e. a first countermeasure (i) configured for direct or indirect connection to or integration into the vehicle and (ii) comprising a first mass ejectable relative to the vehicle following command of the arming device.

12. A force-countering system according to claim 11 in which power is provided to the arming device when the non-momentary switch is closed first, the momentary switch is closed second, and the arm enable switch is closed third.

13. A force-countering system according to claim 12 in which power is provided to the arming device when the non-momentary switch is closed first, the momentary switch is closed second, and the arm enable switch is closed third within 0.5-6 seconds after closure of the momentary switch.

14. A force-countering system for a vehicle, comprising:
    a. first and second sensors configured (i) for direct or indirect connection to or integration into the vehicle and (ii) to sense an acceleration of the vehicle;
    b. a processor directly or indirectly communicating with the first and second sensors so as to receive data therefrom;
    c. an arming device directly or indirectly communicating with the processor so as to receive data therefrom;
    d. a power control assembly comprising plural switches which, when closed in a pre-determined sequence during a pre-determined time period, provide power directly or indirectly to the arming device;
    e. a first countermeasure (i) configured for direct or indirect connection to or integration into the vehicle and (ii) comprising a first cartridge comprising a first housing containing a first charge and a first mass ejectable relative to the vehicle following command of the arming device; and f. a second countermeasure (i) configured for direct or indirect connection to or integration into the vehicle, (ii) comprising a second cartridge comprising a second housing containing a second charge and a second mass ejectable relative to the vehicle following command of the arming device, the second mass being ejectable independently of the first mass.

15. A force-countering system according to claim 14 further comprising third and fourth countermeasures.

16. A force-countering system according to claim 15 in which each of the first, second, third, and fourth countermeasures comprises multiple cartridges.

17. A force-countering system according to claim 16 further comprising first, second, third, and fourth banks of barrels for containing, respectively, the first, second, third, and fourth countermeasures.

* * * * *